June 17, 1924.
A. SCHREIER
AUTOMATIC PROPORTIONATE FEED APPARATUS
Filed June 11, 1921
1,497,701
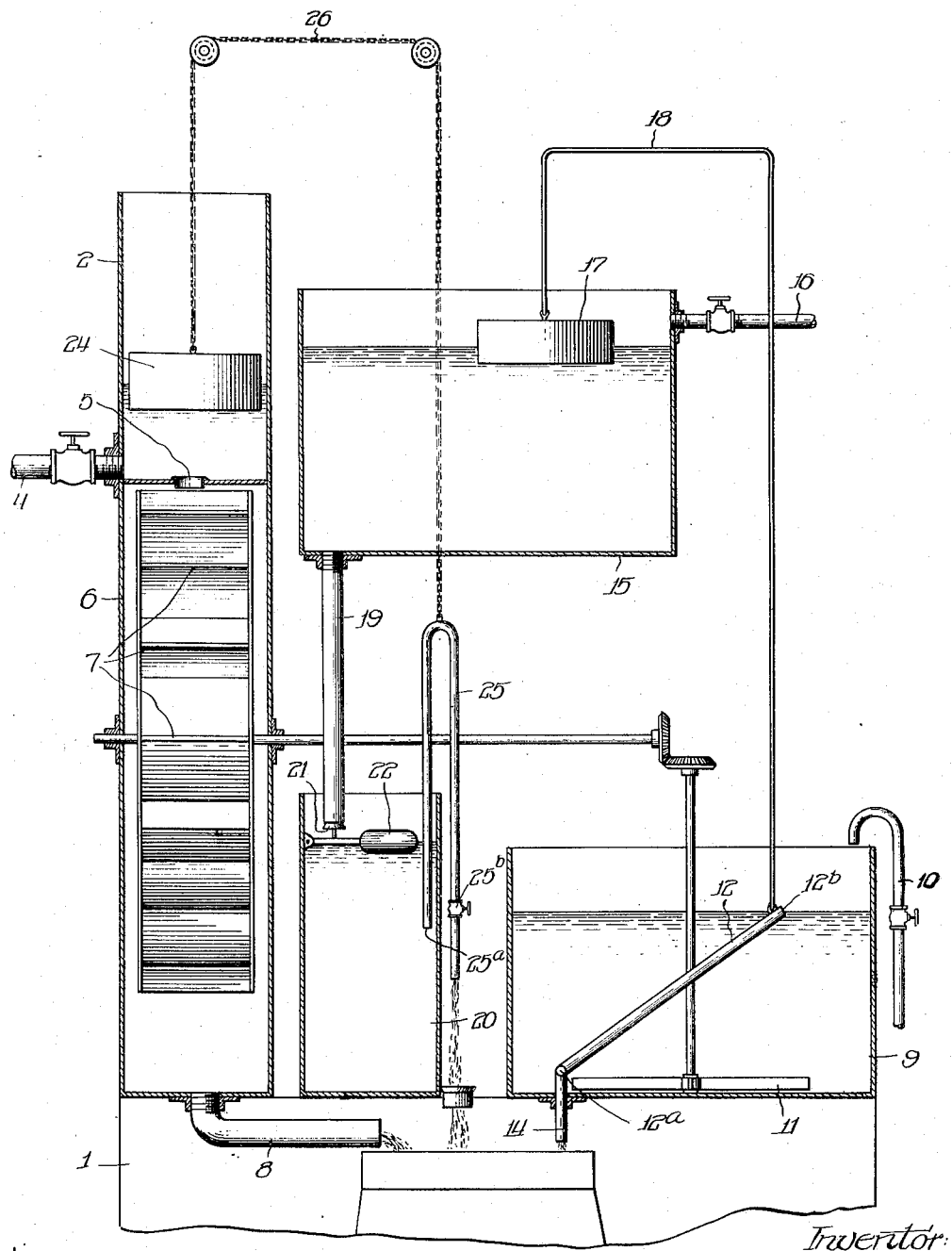
Witness:
A. Burkhardt.
Inventor:
Arthur Schreier,
By Cromwell, Greist & Barber
Attys.

Patented June 17, 1924.

1,497,701

UNITED STATES PATENT OFFICE.

ARTHUR SCHREIER, OF VIENNA, AUSTRIA, ASSIGNOR TO INTERNATIONAL FILTER CO., OF CHICAGO, ILLINOIS, A CORPORATION OF ILLINOIS.

AUTOMATIC PROPORTIONATE-FEED APPARATUS.

Application filed June 11, 1921. Serial No. 476,850.

*To all whom it may concern:*

Be it known that I, ARTHUR SCHREIER, a citizen of the Republic of Austria, residing at Vienna, Austria, have invented certain new and useful Improvements in Automatic Proportionate-Feed Apparatus, of which the following is a specification.

This invention relates generally to liquid treating apparatus of the type designed to feed chemical solutions or suspensions to the liquid being treated, in definite and controllable proportion to the supply thereof. The embodiment upon which the present disclosure is predicated is designed particularly for utilization in water purification or softening plants, but the apparatus is of special utility also in other varied uses such as the treatment of sewage, condensates and the like.

The present invention is designed to meet the requirements where the supply of the treated liquid, which hereafter will be referred to as raw water, is subject to variation in quantity or rate of supply, and also where it is desired to treat large quantities of raw water with relatively small quantities of chemical solutions or suspensions.

The general purpose of the invention is the provision of a simple, accurate and sensitive mechanism which will maintain automatically the desired relative proportion of treating material to raw water.

A more particular object of the invention is to the provision of an apparatus which obviates handling of the raw water by the feed control mechanism for the purpose of accomplishing the automatic regulation of the chemical feed, thereby adapting the apparatus particularly for use in the treatment of liquids containing a large volume of suspended matter.

Another particular object is the provision of an apparatus adapted to control automatically the feed of a plurality of different treating liquids to the raw water.

A still further object is the provision of an apparatus which maintains the accuracy of chemical feed throughout its entire operation.

Another object is the provision of an apparatus which is particularly effective in the proportioning of small quantities of treating liquid to large quantities of treated liquid.

Further objects reside in the construction arrangements, and combinations of parts hereinafter described, and still further objects will be pointed out hereinafter, indicated in the appended claims, or obvious upon an understanding of the invention from the present disclosure.

In the accompanying drawing forming a part of this specification, I have shown diagrammatically one embodiment of the invention, but it is to be understood that the same is presented here entirely for illustrative purpose, and that it is not to be construed as limiting the invention as hereinafter claimed, short of its true scope and position in the art.

The drawing is a diagrammatic illustration in the nature of a vertical section of apparatus embodying the principles of my invention.

Described generally, the invention contemplates the provision of a feed regulating apparatus including a regulating tank or receptacle designed to receive a predetermined quantity of liquid, and apparatus controlled by the level of liquid in said tank for controlling the rate of feed of the treating liquid to the raw water. The discharge from the feed regulating tank, and therefore the fall in level of the regulating liquid, is controlled automatically by apparatus responsive directly to variations in the rate of supply of the raw water. The arrangement is such that the rate of discharge of the regulating liquid is independent of the quantity or head of said liquid in the regulating tank, with the result that the discharge of the regulating liquid may always be maintained in accurate proportion to the supply of raw water.

The invention will be better understood by reference to the drawing in detail.

In the drawing the numeral 1 designates a treating tank, which may be of suitable well known construction and properly equipped and adapted for the reception of the raw water and the intermingling therewith of the treating material, which hereafter will be referred to as the chemical. Associated with the treating tank 1 is the head box 2 constituting a feed receptacle into which the raw water is fed from the supply conduit 4. The head box has a reduced discharge passage 5 of such area as to permit rise of the surface level of raw water in the head box when the supply thereof is in excess to the discharge through the passage 5. The head box may be associated with the wheel box 6 in such fashion that the water from the passage 5 may be discharged upon a water wheel 7 in the wheel box, the raw water being discharged from the wheel box into the tank 1 through the discharge pipe 8. Also associated with the tank 1 is the chemical tank 9 designed to be supplied with the suitable chemical solution or suspension in any suitable manner, as through the pipe 10. An agitating device 11 may be disposed in the chemical tank and coupled with the water wheel 7 by suitable transmission mechanism so as to be driven thereby. The chemical tank is equipped with suitable discharge means, here illustrated by a swinging pipe 12 pivoted at $12^a$ for vertical oscillation, and having an open inlet end $12^b$ adapted to afford flow of chemical from the tank 9 through the outlet 14 into the treating tank 1. This is a well known device and will not be described further in detail.

Associated with the chemical tank is a feed regulating tank 15 adapted to be filled to any desired level with a suitable regulating liquid introduced through the pipe 16. Operating in the feed regulating tank is a float 17, the vertical position of which is determined by the level of the liquid in said tank. This float 17 is coupled by suitable means 18 with the feed pipe 12 in such fashion that the vertical position of the inlet end of said pipe is governed by the vertical position of the float. Discharge of liquid from the feed regulating tank 15 is accomplished through the instrumentality of a discharge means, which includes a pipe 19, a discharge compartment 20 and accessory apparatus now to be described. With the pipe 19 is associated a float controlled valve 21, the float 22 of which is responsive to variations in the level of liquid in the compartment 20, so that, upon said liquid reaching a predetermined level, the valve 21 is closed to prevent discharge of liquid from the tank 15. Upon the liquid in discharge compartment 20 falling below the predetermined level, the valve 21 is opened to permit the flow of liquid from the tank 15 into the compartment 20. As a result, the liquid in compartment 20 is maintained at a substantially constant level. The discharge means comprises also a proportioning device which includes a float 24 operating in the head box 2, a siphon 25 operating in the compartment 20, and connecting means 26 whereby the vertical position of the outlet of the siphon is governed by the vertical position of the float 24. The siphon is provided with a valve $25^b$ whereby flow therethrough may be cut off and liquid retained in it. Said siphon may be arranged to discharge into the treating tank 1, or otherwise as desired.

In the operation of the apparatus, the chemical tank 9 is filled with the desired quantity of chemical suspension or solution of the requisite strength, and the feed regulating tank 15 is filled from pipe 16 with the feed regulating liquid, such as clear water, to a level requisite to position the inlet end of the pipe 12 at the surface of the chemical, whereupon the supply is turned off. The operation of supplying the feed regulating liquid to tank 15 also fills the discharge compartment 20 to the predetermined level, the valve $25^b$ in the siphon being closed to prevent discharge of the liquid therethrough. The supply of water from conduit 4 into the head box 2 then being turned on, the valve $25^b$ is opened and operation of the siphon started substantially simultaneously with the beginning of discharge of raw water into the treating tank through the pipe 8. As the regulating liquid is discharged from the compartment 20 through the siphon, the level of said liquid in the tank 15 will fall, thereby lowering the float 17 and the inlet end of the pipe 12, so that chemical will flow from the tank 9 into the treating tank. Upon an increase in the rate of supply through the conduit 4, the level of raw water in the head box 2 will rise, raising the float 24 and lowering the siphon 25. The rate of flow through the siphon at any given time depends upon the difference in head of the liquid in the discharge compartment 20 between the surface level thereof and the outlet end of the siphon. Since the level of liquid in the compartment 20 is kept constant by the float valve 21, and the position of the outlet end of the siphon is governed by the level of raw water in the head box 2, the rate of flow from the discharge compartment 20 at any given time is determined by the momentary level of raw water in the head box. Since the latter is determined by the momentary rate of supply in conduit 4, and since the rate of discharge of the chemical from the tank 9 is dependent upon the position of the float 17 which is governed by the discharge of liquid from compartment 20, the rate of chemical supply to the treating tank 1 is rendered responsive to the supply of raw water. As a result, the supply of chemical is held in an exact and proportionate relation with the quantity of water being supplied for treatment and, due to the fact that the entire quantity of raw water supplied is the controlling agency, it results that the feed of the chemical, and all variations therein, are more exact, immediate, and sensitive, and more directly responsive than in instances where a small proportion of raw water is depended upon to regulate the feed of chemical. So long as raw water is being supplied to the head box 2, discharge of regulating liquid from tank 15 and of chemical from tank 9 continues, until those tanks are substantially emptied. By the time float 17 reaches the bottom of tank 15, swinging pipe 12 will have reached its low position and it will be necessary to refill tanks 15 and 9. Thereupon valve 25<sup>b</sup> in the siphon may be closed, stopping discharge from compartment 20 and retaining liquid in the siphon so that it will start upon opening of the valve, as above described. Water remains in compartment 20, of course, even after float 17 has reached the bottom of tank 15, so the inlet end 25<sup>a</sup> of the siphon remains submerged. Upon the re-filling of tanks 15 and 9, the above described cycle is again started by the opening of valve 25<sup>b</sup> when the supply of raw water is again turned on.

The invention possesses many advantages over preceding apparatus. Due to the fact that the raw water is not divided for the purpose of regulation, as in by-passing a portion thereof, a more accurate regulation of the chemical feed is attained. This is contributed to also by the utilization of a fall in level of the regulating fluid instead of a rise in the level thereof to govern the feed of the chemical. This permits a more accurate regulation, less subject to disturbing influences. Moreover the arrangement removes the necessity for passing any of the raw water through the control apparatus, and this is of particular advantage in the handling of heated water, very turbid water, water carrying a large volume of suspended material, such as oily waters, condensates and water from paper factories or the like, and is of particular advantage in handling various organic fluids such as sugar juices. This advantage arises from the entire freedom of the regulating apparatus from the possibility of clogging or incrustation by deposits from the treated liquid. This permits accurate regulation with much smaller quantities of regulating liquid, and therefore the control apparatus may be made smaller and more economical.

A further distinct advantage of the present invention lies in the fact that it may be utilized to feed a plurality of different treating chemicals, each in proper proportion to the feed of raw water. For example, if it is desired to treat with both lime and soda, the milk of lime may be disposed in the chemical tank 9, while the soda solution is disposed in the tank 15 and functions both as a treating material and a controlling liquid. Since, as explained above, the discharge from the siphon 25 is always proportionate to the supply of raw water, it is obvious that always the proper amount of soda solution will be fed into the treating tank from the compartment 20 and regulating tank 15.

I claim:

1. A proportionate feed apparatus comprising the combination with a treating tank, of a raw water supply, a chemical supply, means for retaining a regulating liquid, means responsive to changes in the rate of raw water supply for governing discharge of the regulating liquid, and means rendered effective by discharge of the regulating liquid for governing feed of chemical from the chemical supply to the treating tank.

2. In a proportionate feed apparatus the combination with a receptacle for fluid to be treated of a container for a regulating liquid, means responsive to quantity variations in the receptacle for accomplishing a proportionate discharge of regulating liquid, and means responsive to quantity variations in the regulating liquid for governing feed of treating material to the liquid to be treated.

3. In a proportionate feed apparatus the combination of a receptacle for a regulating liquid, chemical feed means controlled by liquid in said receptacle, discharge means for accomplishing a variable discharge of regulating liquid from said receptacle, and means responsive to variations in the supply of liquid for treatment for varying the effectiveness of said discharge means.

4. In a proportionate feed apparatus the combination with a receptacle for raw water, of a receptacle for regulating liquid, discharge means responsive to variations in the quantity of raw water supplied to the first named receptacle for discharging liquid from the second mentioned receptacle, and means for delivering the regulating liquid to the discharge means at a constant level.

5. In a proportionate feed apparatus the combination of a feed receptacle, a regulating receptacle for reception of a regulating liquid, discharge means for discharging regulating liquid, a discharge compartment for presenting regulating liquid to the operation of the discharge means, and means rendering said discharge means effectively responsive to quantity variations of liquid in the feed receptacle.

6. In a proportionate feed apparatus the combination of a feed receptacle, a chemical supply, a receptacle for a regulating liquid, means governed by the regulating liquid for varying feed from the chemical supply, and means responsive to variations in feed of liquid to the feed receptacle for accomplishing discharge of the regulating liquid.

7. In a proportionate feed apparatus the combination with a feed receptacle of a receptacle for a regulating liquid, and means responsive to variations in the feed of liquid to the feed receptacle for governing discharge of the regulating liquid.

8. In a proportionate feed apparatus the combination with a source of chemical supply, of a receptacle for a regulating liquid, and means rendered effective by discharge of the regulating liquid for accomplishing feed of chemical from the chemical supply.

9. The process of dispensing material in proportion to the rate of supply of a primary material which resides in providing a predetermined volume of regulating liquid, discharging said regulating liquid at a rate bearing a definite relationship to the rate at which the primary material is supplied, and controlling the feed of the dispensed material by the rate of discharge of the regulating liquid.

In testimony whereof I have hereunto signed my name in the presence of two subscribing witnesses.

ARTHUR SCHREIER.

Witnesses:
SIGMUND BAUER,
LOUIS GROOSPE.